(12) United States Patent
Mani et al.

(10) Patent No.: US 6,362,275 B1
(45) Date of Patent: Mar. 26, 2002

(54) REDUCTION OF FREE FORMALDEHYDE IN ALDEHYDE RESINS

(75) Inventors: Ramanathan Mani, Dublin; Warren L. Robbins, Delaware, both of OH (US)

(73) Assignee: Ashland Inc., Covington, KY (US)

( * ) Notice: Subject to any disclaimer, the term of this patent is extended or adjusted under 35 U.S.C. 154(b) by 0 days.

(21) Appl. No.: 09/735,284

(22) Filed: Dec. 12, 2000

(51) Int. Cl.⁷ .............................................. C08L 75/00
(52) U.S. Cl. ........................ 524/841; 524/843; 524/845
(58) Field of Search ................................ 524/841, 843, 524/845

(56) References Cited

U.S. PATENT DOCUMENTS

| | | | |
|---|---|---|---|
| 3,917,558 A | 11/1975 | Gardikes et al. | 260/38 |
| 4,323,624 A | 4/1982 | Hunsucker et al. | 428/270 |
| 5,705,537 A | 1/1998 | Hartman, Jr. et al. | 521/84.1 |

FOREIGN PATENT DOCUMENTS

JP   60149638   8/1985   .............. C08J/9/04

*Primary Examiner*—Edward J. Cain
(74) *Attorney, Agent, or Firm*—Martin Connaughton

(57) ABSTRACT

The present invention relates to aldehyde resins having low amounts of free aldehydes and methods of preparing the resins. The reduction in the amount of free aldehydes is accomplished by adding an amino acid to the resin formulation prior to form the resin.

15 Claims, No Drawings

REDUCTION OF FREE FORMALDEHYDE IN ALDEHYDE RESINS

CROSS REFERENCE TO RELATED APPLICATIONS

NA

STATEMENT REGARDING FEDERALLY SPONSORED RESEARCH OR DEVELOPMENT

NA

BACKGROUND OF THE INVENTION

The present invention relates to aldehyde resins having low amounts of free aldehydes. More particularly the present invention relates to aldehyde resins formed in the presence of an amino acid. In the invention aldehyde resins refer to resins derived from the reactions of a phenol, urea, melamine or a mixture thereof and an aldehyde. Examples of aldehyde resins include phenol formaldehyde resins, urea formaldehyde resins, melamine formaldehyde resins, melamine-urea-formaldehyde resins, and the like. These resins are well known in the art.

Phenol formaldehyde resins were the first true synthetic resins to gain commercial acceptance early in the twentieth century. These phenolic resins are the product of the reaction between phenol and formaldehyde. Novalacs are acid catalyzed phenol formaldehyde resins where typically an excess of phenol used. Resoles are the base catalyzed reaction product of phenol and an excess of formaldehyde. In commercial production resoles are normally processed to a workable viscosity; then subsequently polymerized to high molecular weight polymers by simple heating. Urea formaldehyde resins are typically prepared by the condensation of urea and formaldehyde at a pH of between 4 and 7 and at a temperature close to boiling point. Melamine formaldehyde and melamine-urea-formaldehyde resins undergo condensation reactions with an aldehyde in a manner analogous to that of urea. U.S. Pat. No. 5,681,917 discloses a method of making melamine-urea-formaldehyde resins and is herein incorporated by reference.

A problem that exists with aldehyde resin systems is the amount of free formaldehyde that exists in the resins both during storage and upon cure. Formaldehyde is considered toxic and a carcinogen. The American Conference of Governmental and Industrial Hygienists has lowered its TLV to 0.3 ppm. Due to these health concerns much effort has been expended attempting to obtain aldehyde resins with reduced free formaldehyde levels.

An abstract of Japanese patent application 60149638 discloses the use of polyvinyl alcohol to reduce the odor from free formaldehyde in foams produced from resole type phenol-formaldehyde resins. U.S. Pat. No. 3,917,558 discloses the use of nitro compounds such as nitromethane to reduce the concentration of free formaldehyde in phenol-formaldehyde resins. U.S. Pat. No. 5,705,537 discloses the addition of a proteinaceous material, cysteine, glutamic acid, glycine, isoleucine, lysine, phenylalanine, serine tryptophan or mixtures thereof to a phenolic foam composition consisting of a phenol formaldehyde resole resin. The reference discloses the addition of the aldehyde reducing agent to the already formed resin. The use of melamine, urea and sodium sulfite have also been suggested for use as scavengers for formaldehydes. Some reduction in free formaldehyde concentration was noted in uncured resins where these scavengers were used, however during curing at high temperatures free formaldehyde levels increased over precure levels.

There are no suggestions in the art to utilize amino acids and in particular glycine to reduce the free formaldehyde in aldehyde resins by adding the amino acids to the reaction mixture of the aldehyde resin.

BRIEF SUMMARY OF THE INVENTION

The present invention describes aldehyde resins having reduced free formaldehyde. Particularly the invention relates to the use of amino acids to effectively reduce the amount of free aldehyde in the resins. More particularly the invention relates to the use of glycine as a component in aldehyde resins to reduce the free formaldehyde in aldehyde resins. The use of glycine in aqueous aldehyde resin systems also provides the added benefit of increased water tolerance over time.

BRIEF DESCRIPTION OF THE SEVERAL VIEWS OF THE DRAWING

NA

DETAILED DESCRIPTION OF THE INVENTION

The present invention describes aldehyde resins having reduced amounts of free formaldehyde and methods of making the resins. In addition when glycine is added to the reaction mixture of an aqueous aldehyde resin system the resin especially resoles exhibit increased water tolerance over time.

The aldehyde resins for which amino acids will function to reduce free aldehyde include those aldehyde resins known in the art such as phenol formaldehyde, urea formaldehyde, melamine formaldehyde or melamine-urea-formaldehyde.

Phenols used in the preparation of phenol formaldehyde resins include one or more of the phenols which have heretofore been employed in the formation of phenolic resins and are not substituted at either the two ortho positions or at one ortho position and the para position. Such unsubstituted positions are necessary for the polymerization reaction.

Any one or all of the remaining carbon atoms of the phenol ring can be substituted. The nature of the substituent can vary widely and it is only necessary that the substituent not interfere with the polymerization of the aldehyde with the phenol at the ortho and/or para position. Substituted phenols employed in the formation of phenolic resins include alkyl substituted phenols, aryl substituted phenols, cyclo-alkyl substituted phenols, aryloxy substituted phenols, and halogen substituted phenols. The foregoing substituents can contain from 1 to 26 carbon atoms and preferably from 1 to 12 carbon atoms.

Specific examples of suitable phenols include 2,6-xylenol, o-cresol, p-cresol, 3,5-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable.

The urea used to prepared urea formaldehyde resins is available in many forms. Solid urea, such as prill, and urea solutions, typically aqueous solutions are commonly available.

The melamine used in the preparation of melamine and melamine urea formaldehyde resins may be totally or partially replaced with other aminotriazine compounds. Other aminotriazine compounds include substituted melamines, cycloaliphatic guanamines or mixtures thereof. Substituted melamines include alkyl melamines and aryl melamines which can be mono-, di- or tri-substituted. Examples of alkyl substituted include monomethyl melamine, dimethyl melamine, trimethyl melamine, monoethyl melamine and 1-methyl-3-propyl-5-butyl melamine. Examples of aryl substituted melamine include monophenyl melamine and diphenyl melamine.

Aldehydes used to react with the phenol, urea, melamine and combinations thereof have the general formula RCHO wherein R is a hydrogen or hydrocarbon radical having from 1 to 8 carbon atoms. Examples of aldehydes reacted with the phenol, urea, melamine or mixtures thereof include any of the aldehydes heretofore employed in the formation of aldehyde resins such as formaldehyde, acetaldehyde, propionaldehyde, furfuraldehyde, paraformaldehyde and benzaldehyde.

Suitable catalysts used to promote the reaction of the phenol, urea, melamine and mixtures thereof and the aldehyde are also present. Novalak type phenolic resins are typically prepared in the presence of strong acids such as sulfuric acid, sulfonic acid, oxalic acid or occasionally phosphoric acid. Novalak type resins may also be prepared using divalent metal catalysts containing Zn, Mg, Mn, Cd, Co, Pb, Cu, and Ni. Resole type phenolic resins are generally prepared in the presence of basic catalysts such as NaOH, Ca(OH)$_2$ and Ba(OH)$_2$. Other basic catalysts such as triethyl amine may be used to prepare resoles. The catalysts may be used alone or as mixtures. The catalysts used in urea, melamine and melamine-urea formaldehyde resins are well known in the art.

Typically, a dual catalyst system is used to prepare urea, melamine, and melamine-urea resins. Initially the reaction is carried out in the presence of a basic catalyst and completed with an acidic catalyst. Basic catalysts include any of those listed above for preparing resoles. Acid catalysts include weak acids such as formic acid acetic acid and ammonium sulfate.

According to the invention an amino acid or mixture of amino acids is added to the aldehyde resin system prior to forming the resin as a means of providing reduced free aldehyde resins. Amino acids can be obtained by hydrolysis of proteins or synthesized in various ways, especially by fermentation of glucose. Examples of suitable amino acids include lysine, L-leucene and glycine. Glycine is a preferred amino acid. It has been found that as little as 1% by weight glycine based on the total weight of resin solids can reduce the level of free formaldehyde in aldehyde resins to less than about 0.1% by weight and substantially reduce the aldehyde emissions during the curing process.

Another advantage obtained by using glycine in water based aldehyde resin systems is the increased water tolerance with time. For example, water based resole resins when stored increase in viscosity and decrease in water tolerance over time. The use of glycine in water based resole was found to increase the viscosity and also increase the water tolerance with time. In general the advantages of glycine in an aldehyde resin can be obtained by adding from 1 to 3% by weight glycine based on the total weight of resin solids. Of course amounts greater than 3% by weight of an amino acid can be used but it is generally not economically desirable In addition to the above components, other compositions known to those skilled in the art can be added to the aldehyde resins of the present invention. For instance, stabilizers and resin modifiers, emulsifiers, plasticizers and compounds to adjust the pH can be added.

Examples of stabilizers and resin modifiers include methanol, ethanol, isopropanol, borax, and sodium sulfite. Examples of emulsifiers include casein, whey, cellulose, gum and triethyl amine. Examples of plasticizers include glycols. Compounds used to adjust the pH of the aldehyde resins include alkali metals, alkali metal hydroxides, alkali metal carbonates, alkaline earth hydroxides, organic amines, dilute mineral acids and organic acids or acid salts.

The reduced free aldehyde resins of the present invention may be used in any application that comparable aldehyde resins were used. Examples include saturants for cellulosic materials, adhesives for bonding paper, textiles, leather, metals and elastomers, in abrasives, in the manufacture of particle board, as a binder for composite panels, etc.

Having thus described the invention the following examples are illustrative in nature and should not be considered as limiting the scope of the invention. In the examples all amounts were in parts by weight unless otherwise indicated. Initial viscosities were run at 25° C. on a Brookfield viscometer. The hot plate cure was conducted according to ASTM D 4640-86. The 121 gel time test was conducted according to ASTM 3056-96. Specific gravity was run at 25° C. Water tolerance testing was conducted by weighing a resin sample into a vessel at 25° C. and placing the vessel over a piece of newsprint.

Deionized or distilled water was added to the sample with stirring and the newsprint viewed by looking from the top of the vessel through the sample solution. The endpoint was reached when the newsprint could no longer be read through the solution and is expressed as weight percent water added to the sample. The pH of a solution was measured at 25° C. on neat samples using an ACCUMET® Model 15 pH meter from Fisher Scientific. Solids were measured using a standard forced air oven technique. A known weight of a resin was placed in an oven to allow the volatiles to evaporate. After cooling, the sample is reweighed. The percent solids were calculated by dividing the final weight by the original weight, multiplied by 100. Free formaldehyde was measured according to the following procedure. Six g of sample was weighed into a flask. 45 ml of methanol was added with stirring to dissolve the sample. Bromophenol blue indicator was added to he vessel. A blank was prepared in the same manner without the sample.

Sample and blank were titrated to a blue green endpoint. If prior to titration the sample solution was blue it was titrated with sulfuric acid. If the solution was yellow it was titrated with NaOH. Subsequently, 15 ml of a 10% aqueous hydroxylamine hydrochloride solution was added to the vessel and allowed to stand for from 5 to 10 minutes. The sample and blank were then titrated with NaOH to a blue green end point.

The percent free formaldehyde was calculated by subtracting the ml of NaOH required to reach the blue green end point of the blank from the ml of NaOH required to reach the blue green endpoint of the blank from the ml of NaOH required to reach the endpoint of the sample solution, multiplying that number by the normality of the NaOH and then by 3.003 and finally dividing the result by the weight of the sample.

EXAMPLE 1

100 g of phenol, 127.16 g of a 50% aqueous solution of formaldehyde and 14.8 g of a 20% aqueous solution of NaOH were added to a vessel with stirring and heated to 70° C. and held at that temperature for 20 minutes. The reaction mixture was then allowed to reflux for an additional 14 minutes. The reaction mixture was cooled back to 80° C. and held until a water tolerance of from 280 to 320% was obtained. The mixture was then cool rapidly to 70° C. and 8.0 g of a 20% aqueous solution of NaOH was added. The mixture was then cooled to room temperature and 8.86 g of methanol was added and mixed for 10 to 15 minutes.

EXAMPLE 2

400g of phenol and 60 g of a 10% aqueous NaOH solution were added to a vessel with stirring and heated to 60° C. 8 g of casein was added to the vessel and stirred until the casein dissolved. The reaction mixture was cooled to 50° C. and 516 g of a 50% aqueous solution of formaldehyde and 20 g of methanol were added. The reaction mixture was heated to 70° C. and held at temperature for 20 minutes. 20 g of melamine was added and the reaction mixture was allowed to reflux for 20 to 30 minutes until a hot plate cure of about 40 seconds was obtained. The reaction mixture was then cooled to 65° C. and 20 g leucine was added and allowed to dissolve. After dissolving the leucine, 5 g of sodium sulfite was added and stirred until it dissolved in the reaction mixture. The reaction mixture was then allowed to cool to room temperature.

EXAMPLE 3

400 g of phenol and 60 g of a 20% aqueous solution of NaOH were added to a vessel with stirring and heated to 60° C. 20 g of casein was added and stirred until dissolved in the reaction mixture. The mixture was then cooled to 50° C. and 516 g of a 50% aqueous solution of formaldehyde and 35 g of methanol were added to the reaction mixture. The mixture was heated to 70° C. and held at that temperature for 20 minutes. 20 g of melamine was then added and the mixture was allowed to reflux until a hot plate cure of about 45 seconds was obtained. The mixture was cooled to 65° C. and an additional 20 g was added to the reaction mixture and allowed to mix for 5 minutes. 20 g of glycine was then added and allowed to dissolve in the mixture. After dissolving the glycine, 5 g of sodium sulfite was added to the mixture with stirring until dissolved. The reaction mixture was then allowed to cool to room temperature and adjusted to a solids level of about 55% with deionized water.

EXAMPLE 4

The same procedure used in Example 3 was followed in Example 4 with the exception that no melamine was added to the reaction mixture.

| Ingredients | Amount |
| --- | --- |
| Phenol | 400 |
| Formaldehyde (50%) | 516 |
| Casein | 20 |
| Methanol | 40 |
| NaOH (20%) | 60 |
| NaOH (20%) | 30 |
| $Na_2 SO_3$ | 5 |
| Glycine | 15 |
| DI Water | 55 |

EXAMPLE 5

100 g of phenol, 58 g of a 91% aqueous solution of paraformaldehyde, 12 g of isopropyl alcohol and 6 g of methanol were added to a reaction vessel with stirring. Subsequently 3 g of a 20% aqueous solution of NaOH and 1 g of triethylamine (TEA) were added slowly with stirring. The reaction mixture was heated to 75° C. and held at temperature for 30 minutes. The mixture was refluxed until a hot plate cure of about 38 seconds was obtained and then cooled to 60° C. 25 g of methanol was added during the cool down to 60° C. and the reaction mixture was held with stirring for 10 minutes. The reaction mixture was then cooled to 50° C. and 3.8 g of an 88% aqueous solution of lactic acid was added. The reaction mixture was allowed to cool to room temperature and adjusted to a percent non-volatiles of about 65% with methanol.

EXAMPLE 6

The same procedure used in Example 5 was followed in Example 6 with the exception that melamine was added prior to reflux and an additional 2 g of glycine predissolved in a 20% aqueous NaOH solution was added after reflux.

| Ingredients | Amount |
| --- | --- |
| Phenol | 100.00 |
| Paraformaldehyde (91%) | 58.00 |
| Isopropyl alcohol | 12.00 |
| Methanol | 6.00 |
| NaOH (20%) | 3.00 |
| Triethylamine | 1.00 |
| Melamine | 4.00 |
| Methanol | 25.00 |
| Glycine | 1.34 |
| NaOH (20%) | 5.00 |
| Lactic Acid (88%) | 2.00 |
| Glycine | 2.00 |

EXAMPLE 7

The same procedure used in Example 6 was followed in Example 7 with the exception that glycine was dissolved in water prior to addition to the reaction mixture.

| Ingredients | Amount |
|---|---|
| Phenol | 100.00 |
| Paraformaldehyde (91%) | 58.00 |
| Ethanol | 9.00 |
| Methanol | 9.00 |
| NaOH (20%) | 3.00 |
| Triethylamine | 1.00 |
| Melamine | 4.00 |
| Urea | 2.00 |
| Glycine | 2.00 |
| DI Water | 8.00 |
| Lactic Acid (88%) | 2.00 |

EXAMPLE 8

95 g of formaldehyde was added to a vessel and heated to 50° C. The pH was adjusted to 7.5 with a 20% aqueous NaOH solution. 45 g of urea was added to the vessel and the temperature raised to 95° C. The reaction mixture was allowed to reflux. The pH was maintained during reflux by adding small amounts of 20% aqueous NaOH. After refluxing the reaction mixture was cooled to 75° C. and the pH was adjusted to 5.4–5.6 with a 10% aqueous formic acid solution. The mixture was then reheated to 95° C. and held at that temperature for 1 hour. The mixture was then cooled to 60° C. and the pH adjusted to 9.2. Half of the mixture was decanted. 2% by weight of glycine based on the weight of the mixture remaining in the vessel, dissolved in 40 g of warm water was added to the mixture in the vessel with stirring at a temperature of 60° C. for 30 minutes and then cooled to room temperature.

The amount of free formaldehyde in the glycine treated resin and in the untreated resin was determined. The results are in Table I.

TABLE I

| Example 10 | 1 | 2 | 3 | 4 | 5 | 6 | 7 | 8 |
|---|---|---|---|---|---|---|---|---|
| Visc (cps) | 198 | 440 | 328 | 162 | | 1625 | 280 | |
| Hot plate cure (sec) | 34 | 37 | 38 | | 37 | 31 | 43 | |
| 121 gel time (min) | 14.1 | 13.5 | 155 | 15.3 | 11.1 | 10.7 | 13.8 | |
| Sp. Gravity | 1.187 | 1.195 | 1.192 | | | | | |
| Initial Water Tolerance (%) | 450 | 93 | 115 | 200 | | | | |
| pH | 9.4 | 8.2 | 8.1 | 8.9 | 5.05 | 7.79 | 6.48 | 9.2 |
| Solids | 55.0 | 58.8 | 57.2 | 54.4 | 64.0 | 64.0 | 64.0 | |
| Free formaldehyde before cure (%) | 1.0 | 0.1 | 0.1 | | 1.0 | 0.2 | 0.3 | 2.1* |

*The free formaldehyde in the resin prior to addition of the glycine was 4.4% by weight.

EXAMPLES 9–12

Examples 9–12 were prepared as above and subject to a one week stability study by placing samples of each in a constant temperature oven at 40° C. The object was to illustrate the increased water stability of aqueous resins containing an amino acid compared to the same composition without the amino acid. Examples 9 and 10 were prepared according to Example 3, with the exception that glycine was not added to Example 10.

Examples 11 and 12 were prepared in the same manner as Example 1 with the exception that in Example 12 g glycine was added after the first addition of NaOH and allowed to react for 30 to 40 minutes.

The results of the heat aging on viscosity and water tolerance are found in Table II.

TABLE II

| | Example 9 | | Example 10 | | Example 11 | | Example 12 | |
|---|---|---|---|---|---|---|---|---|
| Day | Visc (cps) | Water Tol (%) | Visc (cps) | Water Tol (%) | Visc (cps) | Water Tol (%) | Visc (cps) | Water Tol (%) |
| Initial Wat Tol. | 350 | 187 | 36 | 110 | 225 | 440 | 280 | 460 |
| 1 | 570 | 175 | 225 | 94 | 265 | 405 | 465 | 600 |
| 4 | 2750 | 210 | 745 | 52 | 875 | 380 | 2950 | 1144 |
| 5 | 3400 | 220 | 1060 | 30 | 1520 | 360 | 6800 | 1950 |
| 6 | 7700 | 350 | 2250 | <8 | 2780 | 360 | 23500 | >2000 |
| 7 | 14400 | 1296 | | | 6250 | 390 | 59500 | 72000 |

We claim:

1. An aldehyde resin, comprising the reaction product of;
   A. a phenol, urea, melamine or mixtures thereof with,
   B. an aldehyde, and
   C. an amino acid,
   D. in the presence of a catalyst.

2. The aldehyde resin of claim 1 where the aldehyde is present in a molar excess of the phenol and the catalyst is a basic catalyst.

3. The aldehyde resin of claim 1 where the resin is an aqueous dispersion.

4. The aldehyde resin of claim 1 where the resin is an aqueous solution.

5. The aldehyde resin of claim 1 where the resin is a nonaqueous solvent solution.

6. The aldehyde resin of claim 1 where the amino acid is L-leucine or glycine.

7. The aldehyde resin of claim 1 where the aldehyde is present in a molar excess of the phenol, the catalyst is a basic catalyst, the amino acid is glycine and the resin is an aqueous dispersion or an aqueous solution.

8. The aldehyde resin of claim 3 where in the resin further comprises an emulsifier.

9. A method of reducing free aldehydes in aldehyde resins, comprising; adding an amino acid to the resin reaction mixture.

10. The method as claimed in claim 9 where the aldehyde resin is a resole.

11. The method as claimed in claim 9 where the amino acid is L-leucine or glycine.

12. The method as claimed in claim 9 where the aldehyde resin is an aqueous dispersion of a resole resin.

13. The method as claimed in claim 9 where the aldehyde resin is an aqueous solution of a resole resin.

14. The method as claimed in claim 9 where the aldehyde resin is a non aqueous solvent solution.

15. The method as claimed in claim 12 where the amino acid is glycine.

* * * * *